(12) United States Patent
Krempa et al.

(10) Patent No.: US 10,275,268 B2
(45) Date of Patent: Apr. 30, 2019

(54) PROVIDING ENTROPY TO A GUEST OPERATING SYSTEM

(71) Applicant: Red Hat, Inc., Raleigh, NC (US)

(72) Inventors: Peter Krempa, Badin (SK); Eric Blake, Salt Lake City, UT (US)

(73) Assignee: Red Hat, Inc., Raleigh, NC (US)

( * ) Notice: Subject to any disclaimer, the term of this patent is extended or adjusted under 35 U.S.C. 154(b) by 513 days.

(21) Appl. No.: 14/010,188

(22) Filed: Aug. 26, 2013

(65) Prior Publication Data

US 2015/0058841 A1 Feb. 26, 2015

(51) Int. Cl.
*G06F 9/455* (2018.01)

(52) U.S. Cl.
CPC .......... *G06F 9/45558* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 8,112,753 B2 | 2/2012 | Van Riel et al. | |
| 2010/0199104 A1 | 8/2010 | Van Rijnswou | |
| 2011/0047545 A1* | 2/2011 | Ellison et al. | 718/1 |
| 2011/0161973 A1* | 6/2011 | Klots | G06F 17/30566 718/104 |
| 2012/0198440 A1* | 8/2012 | Shah | G06F 9/45558 718/1 |
| 2013/0325918 A1* | 12/2013 | Sherwood | G06F 7/588 708/250 |
| 2014/0244785 A1* | 8/2014 | Potlapally et al. | 709/217 |

FOREIGN PATENT DOCUMENTS

| | | |
|---|---|---|
| WO | WO2009051471 | 4/2009 |
| WO | WO2012058613 | 5/2012 |

OTHER PUBLICATIONS

Men & Mice, "Randomness in Virtual Machines", From Men & Mice, retrieved from https://otrs.menandmice.com/otrs/public.pl?Action=PublicFAQZoom&ItemID=122, Aug. 27, 2013, 1 page.
Shah, Amit, "About Random Numbers and Virtual Machines", From Amit Shah's Blog, http://log.amitshah.net/2013/01/about-random-numbers-and-virtual-machines/, Jan. 11, 2011, 3 pages.

(Continued)

*Primary Examiner* — Wynuel S Aquino
(74) *Attorney, Agent, or Firm* — Lowenstein Sandler LLP (57) ABSTRACT

The subject matter of this specification can be implemented in, among other things, a method including receiving, by a hypervisor of a host computer system, an entropy request from a guest operating system running on the host computer system. The method further includes identifying, by the hypervisor, an entropy source. The method further includes determining, by the hypervisor, an expected entropy usage at the host computer system. The method further includes providing, in response to the request, entropy from the entropy source to the guest operating system in view of the expected entropy usage.

17 Claims, 4 Drawing Sheets

(56) References Cited

OTHER PUBLICATIONS

Serverfault, "How Do I Get /Dev/Random to Work on an Ubuntu Virtual Machine?", From Serverfault, http://serverfault.com/questions/304372/how-do-i-get-dev-random-to-work-on-an-ubuntu-virtual-machine, Aug. 24, 2011, 3 pages.

Plankers, Bob, "Four Things VMware Engineering Can Give Me for Christmas", From the Lone Sysadmin, http://lonesysadmin.net/2012/12/18/four-things-vmware-engineering-can-give-me-for-christmas/, Dec. 18, 2012, 7 pages.

Serverfault, "Entropy on Virtual Machines", From Serverfault, http://serverfault.com/questions/324217/entropy-on-virtual-machines, Oct. 24, 2011, 3 pages.

\* cited by examiner

PROVIDING ENTROPY TO A GUEST OPERATING SYSTEM

TECHNICAL FIELD

Implementations of the present disclosure relate to a computing system, and more specifically, to providing entropy to a guest operating system.

BACKGROUND

In computer engineering, the term entropy is used to describe random computer data. Many system components depend on entropy (e.g., random numbers) for various tasks. For example, media players use random numbers to shuffle music or video playback. Random numbers are also used in cryptography to secure data. Entropy can also be used in virtualization. Virtualization entails running programs, usually multiple operating systems, concurrently and in isolation from other programs on a single system. Virtualization may be achieved by running a software layer, often referred to as "hypervisor," above the hardware and below the virtual machines. A hypervisor may abstract a physical hardware layer and present this abstraction to virtual machines to use, by providing interfaces between the underlying hardware and virtual devices of virtual machines. The virtual machines in turn can run guest operating systems. The guest operating systems may use random numbers to accomplish different tasks of varying complexity, such as for games, animations, cryptography, electronic gambling, and financial applications.

DESCRIPTION OF DRAWINGS

The details of one or more implementations are set forth in the accompanying drawings and the description below. Other features and advantages will be apparent from the description and drawings, and from the claims.

DETAILED DESCRIPTION

The present disclosure pertains to providing entropy to a guest operating system (OS) of a virtual machine. Entropy can refer to a stream of random data, which can include random bits, random numbers, etc. Entropy can be generated in various ways and is commonly generated using a random number generator (RNG) which represents a device designed to generate a sequence of numbers or symbols that lack any pattern. Having access to and using entropy is a core feature of a guest OS. A guest OS can use entropy when producing an unpredictable result is desired, such as in games, media, gambling, statistical sampling, cryptography, and the like.

To provide entropy to a guest OS, some contemporary approaches provide an emulated hardware RNG to the guest OS. Hardware devices, however, are typically designed with respect to physical aspects of a computing system. Thus, hardware devices are usually not well suited to be emulated by software. When hardware devices, such as RNGs, are emulated by software, they usually suffer from a decrease in performance. This is largely because a guest OS does not have direct access to a hardware RNG. Instead, the guest OS has access to a hardware RNG only via multiple layers, which include the virtual machine and hypervisor layers. These additional layers introduce complexity and time that hinders operations of the guest OS. A guest OS that is configured in this manner significantly lacks in performance as compared to a computing system that is directly connected (i.e., bare metal) to a hardware RNG.

Other contemporary approaches provide a guest OS with direct access to a hardware RNG. Only one guest OS, however, can have access to a hardware RNG when it is configured as a direct access device. Other guest OS and even a host OS would not have access to such a device.

Yet other approaches provide a single source of entropy while there are multiple consumers. This creates a competitive environment where one consumer could "starve" others by consuming too much entropy. Further approaches have attempted to use multiple entropy sources. Even when multiple entropy sources may be available, contemporary guest OSs only have access to one entropy source at a time.

Aspects of the present disclosure address these shortcomings by providing entropy from one or more entropy sources to multiple entropy consumers in a structured manner. A guest OS can submit a request for entropy. A hypervisor receives the request and identifies an entropy source. The hypervisor determines an expected entropy usage among all entropy consumers within the system. The hypervisor can then provide entropy from the entropy source to the guest OS in view of the expected entropy usage. The hypervisor can provide the entropy to the guest OS using a paravirtualized device. When a guest OS uses a paravirtualized device, the guest OS recognizes the paravirtualized device as being a virtualized device and can take steps to optimize accesses to the device, which provides performance similar to that of a host operating system that is directly connected to the hardware RNG. For example, the guest OS can trust all entropy from the paravirtualized device as being random. The guest OS can use the received entropy without modifying the entropy and without using the entropy for subsequent entropy generation, which improves efficiency of the guest OS. Because the paravirtual device is implemented by a hypervisor (i.e., it is not an assigned device), multiple devices can still access a single physical device that serves as a backend to the paravirtual device. The hypervisor can also locate entropy from multiple resources and allocate entropy with respect to all entropy consumers within the system such that important or critical processes have priority over other processes in the event of an entropy shortage.

Entropy is often gathered by observing events that occur randomly by, for example, measuring time intervals between such events, counting such events, etc. The random events may originate from hard-to-predict events, such as network, user and disk activity (e.g., key-presses, mouse movements, jitter of disk access times), radioactive decay, avalanche effects on reverse-biased electronic components, environmental sources (e.g., thermal, atmospheric), detection of photons travelling through semi-transparent mirrors, and the like. The resulting data (e.g., measured time intervals, event counts, etc.) can be stored as a unit of information in an entropy pool. An operating system can maintain the entropy pool and continually fill it with entropy. For example, the kernel of the Linux operating system can store entropy in binary bits. The entropy pool can be available to various host computer components that can draw entropy from the pool.

In addition to an operating system that gathers entropy, there are other approaches that generate entropy. These approaches can contribute to the entropy pool or can provide entropy directly to an entropy consumer. One approach to generating entropy is to use pure software, which uses computations for entropy generation and is often described as a pseudo-random number generator (PRNG). A PRNG uses an algorithm to create long sequences of numbers that are ostensibly random. PRNGs use a starting value (i.e., a seed) that is used by the algorithm to generate entropy. The seed may be taken from a random value, such as the current time, a time between user inputs, or other hard-to-predict value. The seed may also be chosen arbitrarily by the PRNG. A seed may also be generated by a random number generator (RNG) and provided to the PRNG, as described herein. Because PRNGs use pure software, they are typically fast in their ability to generate entropy, although they typically provide entropy of lesser quality when compared to a hardware RNG. RNG's are often slower than PRNGs at generating entropy because RNGs depend on random external events.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

For brevity, simplicity and by way of example, a hypervisor performs many of the operations described herein. It is contemplated that other actors may perform some or all of the operations described herein, including a host operating system, multiple hypervisors, an entropy controller, and the like, including a combination thereof.

Figure 1:
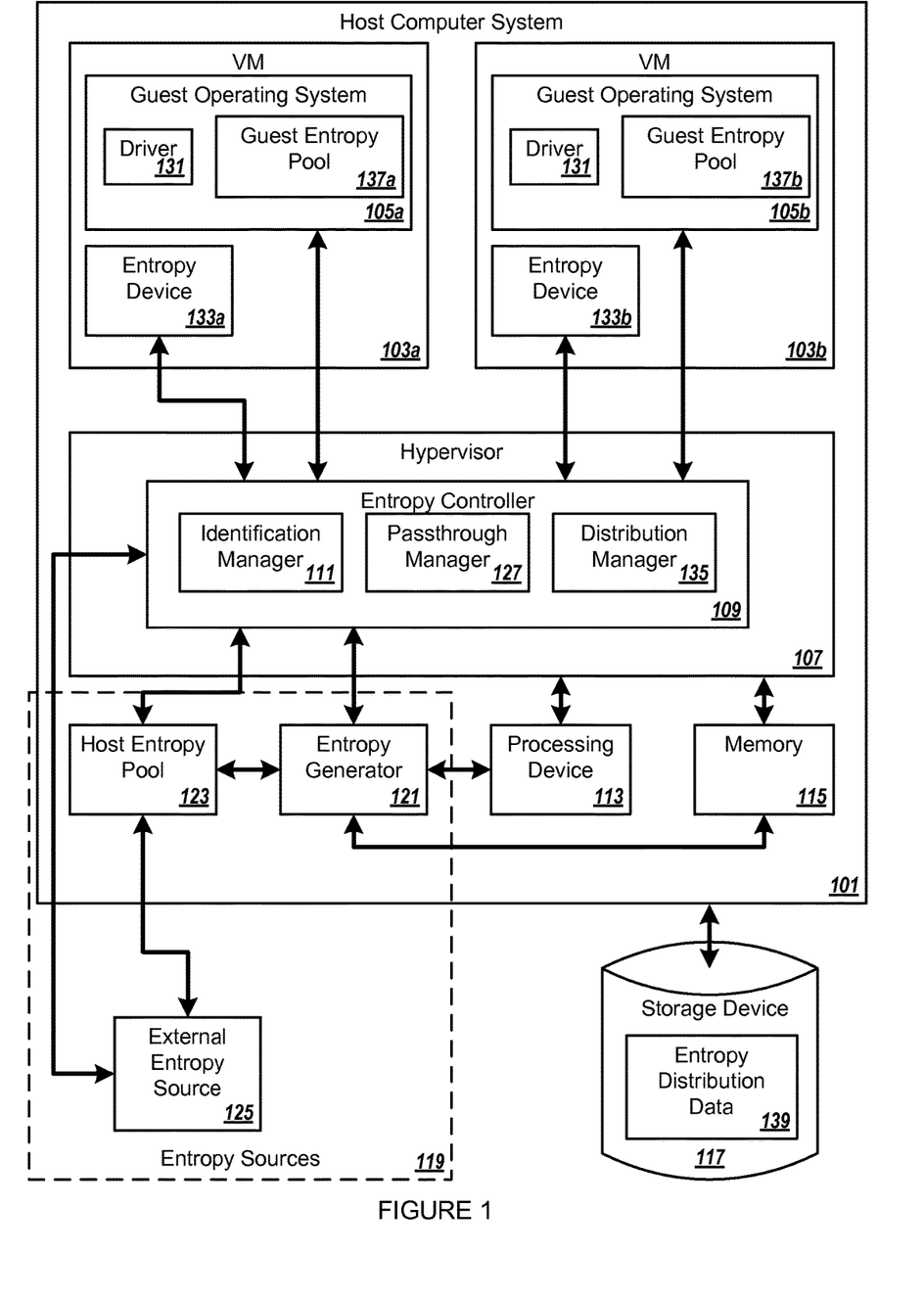
FIG. 1 is a block diagram of a host computer system in accordance with some implementations.

FIG. 1 is a block diagram that illustrates an example of a host computer system 101 that hosts one or more virtual machines (VM) 103a, 103b. Each VM 103 runs a guest operating system (OS) 105. The VMs 103 may have the same or different guest operating systems 105a, 105b, such as Microsoft Windows®, Linux®, Solaris®, Mac® OS, etc. The host computer system 101 may be a server, a workstation, a personal computer (PC), a mobile phone, a palm-sized computing device, a personal digital assistant (PDA), etc.

The host computer system 101 runs a hypervisor 107 to virtualize access to the underlying host hardware, making the use of the VMs 103 transparent to the guest OSs 105 and a user of the host computer system 101. The hypervisor 107 may also be known as a virtual machine monitor (VMM) or a kernel-based hypervisor. The hypervisor 107 may be part of a host OS (not shown), run on top of the host OS, or run directly on the host hardware without an operating system beneath it (i.e., bare metal). The host OS can be the same OS as the guest OS 105, or can be a different OS.

The host computer system 101 can include hardware components such as one or more physical processing devices (e.g., central processing units (CPUs)) 113, memory 115 (also referred to as "host memory" or "physical memory") and other hardware components. In one implementation, the host computer system 101 includes one or more physical devices (not shown), which can be audio/video devices (e.g., video cards, sounds cards), network interface devices, printers, graphics modules, graphics devices, system components (e.g., PCI devices, bridges, ports, buses), etc. It is understood that the host computer system 101 may include any number of devices.

The host computer system 101 may also be coupled to one or more storage devices 117 via a direct connection or a network. The storage device 117 may be an internal storage device or an external storage device. Examples of storage devices include hard disk drives, optical drives, tape drives, solid state drives, and so forth. Storage devices may be accessible over a local area network (LAN), a wide area network (WAN) and/or a public network such as the internet. Examples of network storage devices include network attached storage (NAS), storage area networks (SAN), cloud storage (e.g., storage as a service (SaaS) as provided by Amazon® Simple Storage Service (S3®), Rackspace® Cloud Storage, etc.), and so forth.

The host computer system 101 may also be coupled to one or more entropy sources 119. The entropy sources 119 can include entropy-generating devices connected to the host computing system 101, as well as guest OS s that are executing on the host computing system 101. An example of an entropy source 119 is an entropy generator 121, which itself generates entropy using one or more of the entropy generation techniques described herein (e.g., PRNG, RNG). Another entropy source 119 can be a host entropy pool 123 that collects and/or receives. entropy from other entropy sources including hardware and/or software sources such as RNGs or PRNGs. In one implementation, the host entropy pool 123 can be implemented in a kernel of a host OS. A further entropy source 119 can be an external entropy source 125, which can be an external RNG (e.g., a USB RNG), a RNG or PRNG of another host computer system, an entropy pool of another host computer system, and the like.

The hypervisor 107 can include an entropy controller 109 that identifies and distributes entropy from one or more entropy sources to one or more entropy consumers, such as to a guest OS 105. To perform these and other functions, the entropy controller 109 can include various components, including an entropy identification manager 111, a passthrough manager 127 and an entropy distribution manager 135.

The entropy identification manager 111 identifies one or more entropy sources 119 (e.g., based on information distributed by entropy sources, or by a processor on behalf of an entropy source, to other components of the host). The entropy identification manager 111 can determine how much entropy the entropy sources 119 can provide and can store this information as entropy distribution data 139 in storage 117. In one implementation, the entropy identification manager 111 can include a daemon that gathers and intermixes entropy from one or more sources, such as entropy sources 119, and then outputs the gathered entropy as one stream.

The passthrough manager 127 can provide the guest OS 105 with entropy from the entropy sources 119. The entropy can be provided to the guest OS 105 as a guaranteed random number stream, for example. The passthrough manager 127 can provide entropy to the guest OS 105 in different ways. In one implementation, the passthrough manager 127 emulates a physical RNG (e.g., entropy generator 121, external entropy source 125) in the hypervisor 107. The emulated RNG intercepts and processes I/O requests addressed to the physical RNG.

In another implementation, the passthrough manager 127 presents entropy to the guest OS 105 using an entropy device 133. The entropy device 133 is a paravirtualized device (also referred to as a paravirtual device) (e.g., a virtio RNG). A paravirtualized device is a type of virtual device that the guest OS 105 knows is a virtual device. Because the guest OS 105 knows that it is in a virtual environment, it is possible to avoid the overhead of emulating the real hardware. For paravirtualized devices, a driver that interfaces with the paravirtualized device can be installed in the guest OS 105. In Linux, this interface is referred to as the "virtio" interface. Virtio provides an efficient abstraction for hypervisors and a common set of I/O virtualization drivers.

Using paravirtualization techniques, passthrough manager 127 presents a software interface in the form of the entropy device 133 to the guest OS 105 in a manner nearly identical to that of the underlying hardware (e.g., the entropy source 119). As a result, the guest OS 133 can use an entropy device 133 as if it were a hardware RNG. The entropy device 133 communicates with the guest OS 105 via a driver 131 in the guest OS 105. In one implementation, the driver 131 is part of the kernel of the guest OS 105. The entropy device 133 can provide entropy to the guest OS 105 directly from the host entropy source 119. Accordingly, the guest OS 105 sees the entropy device 133 as a hardware RNG and can use it in the same manner as a bare metal system can without performing any additional manipulations to the entropy.

In an example, the passthrough manager 127 creates a virtual PCI device (e.g., entropy device 133) in the guest OS 105 I/O address space that is recognized by the driver 131. The virtual PCI device 133 is presented to the guest OS 105 as a hardware RNG device. After the driver 131 is loaded, the device 133 is available to the guest OS 105. When the guest OS 105 requests entropy from the device 133 (e.g., as blocks of random numbers), the request is handled by the passthrough manager 127 of the hypervisor 107. The passthrough manager 127 sources entropy from an available entropy source ("backing entropy source") 119 that was identified by the entropy identification manager 111 and returns the requested entropy (e.g., as blocks of random numbers) to the guest OS 105.

In some implementations, the entropy device 133 is presented or exposed to the guest OS 105 as a different type of device than the backing entropy source 119. The type of device that is presented to the guest OS can be better, easier and more efficient for the hypervisor 107. For example, the entropy source 119 can be an external USB entropy source 125 that is presented to the guest OS 105 as a virtio device 133. This results in increased efficiency for the guest OS 105 because the hypervisor 107 can handle virtio devices without translation. Using different device types is beneficial because when the entropy source 119 and the entropy device 133 are the same device type, the USB commands should be translated once for the hypervisor 107, and then should be translated again to the USB protocol for the actual USB device. When the entropy device 133 is a virtio device, for example, the hypervisor 107 does not need to translate commands between the virtio device 133. Instead, the hypervisor 107 can only translate the commands once—when interfacing with the USB entropy source 119.

In other implementations, entropy device 133 can generate random numbers using entropy from the entropy source 119 as a seed value. In certain implementations, the entropy device 133 can be a source of entropy for and can contribute to the host entropy pool 123.

The entropy controller 109 can further include a distribution manager 135 to manage entropy distribution to multiple entropy consumers. The entropy consumers can include the host computer system 101 and one or more guest operating systems 105a, 105b. The entropy distribution manager 135 can be in communication with all entropy consumers and can predict expected entropy usage for each entropy consumer. Using this expected usage information, the entropy distribution manager 135 can determine an aggregate expected entropy usage that the passthrough manager 127 can use when providing entropy to each consumer. The expected entropy usage for each consumer as well as the aggregate expected entropy usage can be stored as entropy distribution data 139 in the storage device 117 and can be recalled for later use. The passthrough manager 127 can access and use the entropy distribution data 139 when providing entropy to entropy consumers. For example, when the entropy controller 109 receives a request for entropy from a guest OS 105, the passthrough manager 127 can access the entropy distribution data 139. In one implementation, when the request exceeds the entropy source's 119 ability to satisfy the request in view of the entropy distribution data 139, the passthrough manager 127 can provide less entropy (e.g., fewer random numbers) to the guest OS 105 than was requested. At a later time, when the entropy source 119 is able to satisfy the request, the passthrough manager 127 can provide the rest of the requested entropy to the guest OS 105. In another implementation, when the request exceeds the entropy sources 119 ability to satisfy the request in view of the entropy distribution data 139, the passthrough manager 127 can wait until the entropy sources are able to satisfy the request before providing the entropy to the guest OS 105.

The entropy distribution manager 135 can also provide a priority hierarchy that the passthrough manager 127 can use when providing entropy. The priority hierarchy can indicate to the passthrough manager 127 how it should provide entropy and whether some entropy consumers should receive entropy before other consumers. The priority hierarchy can be based on an application type or classification, importance, security, etc., and can be created by a system administrator. The priority hierarchy can be constructed in terms of entropy consumers. In an example, the priority hierarchy indicates that the host computing system 101 is to have first priority when the passthrough manager 127 provides entropy. The priority hierarchy can also indicate which guest OS 105 should receive entropy before others. In some implementations, the priority hierarchy can indicate that once a guest OS 105a receives a threshold amount of entropy, entropy can be provided to the next guest OS 105b in the priority hierarchy. In another implementation, the priority hierarchy can also be constructed with respect to a process. For example, the priority hierarchy can indicate that some processes are more important than others and should receive entropy before less important processes. A cryptographic key generation process, for example, might be more important than a simple game under the priority hierarchy. The priority hierarchy can create an entropy distribution framework using any set of criteria.

In implementations, the expected entropy usage and the priority hierarchy are used in combination to set aside entropy for high priority entropy consumers (e.g., host computing system 101, guest OSs 105a, 105b, processes). For high priority entropy consumers, the entropy distribution manager 135 can identify the expected usage data for those entropy consumers. Entropy for these high priority entropy consumers is reserved and the remaining entropy is allocated to lower priority entropy consumers. For example, the host computing system 101 is a high priority entropy consumer can be allowed to use twenty percent of the theoretical maximum amount of entropy the entropy source 119 is able to provide. The remaining eighty percent is allocated and distributed among the remaining entropy consumers. The entropy distribution manager 135 can allocate and reserve any amount of entropy for any number of entropy consumers and can do so using any type of structure (e.g., a tiered structure for distributing entropy according to multiple tiers within a tiered hierarchy).

In another implementation, the guest OS 105 includes a guest entropy pool 137. The passthrough manager 127 can provide entropy from the entropy source 119 to the guest entropy pool 137 at any time (e.g., periodically, on demand). In one implementation, when the guest entropy pool 137 needs more entropy, the guest OS 105 transmits an entropy request to the entropy controller 109. For example, when an application of the guest OS 105 is depleting the guest entropy pool 137 at a faster rate than normal, the guest OS 105 can request more entropy. The guest OS 105 can also request entropy at other times, such as when the available entropy in the guest entropy pool 137 is below a threshold amount.

Figure 2:
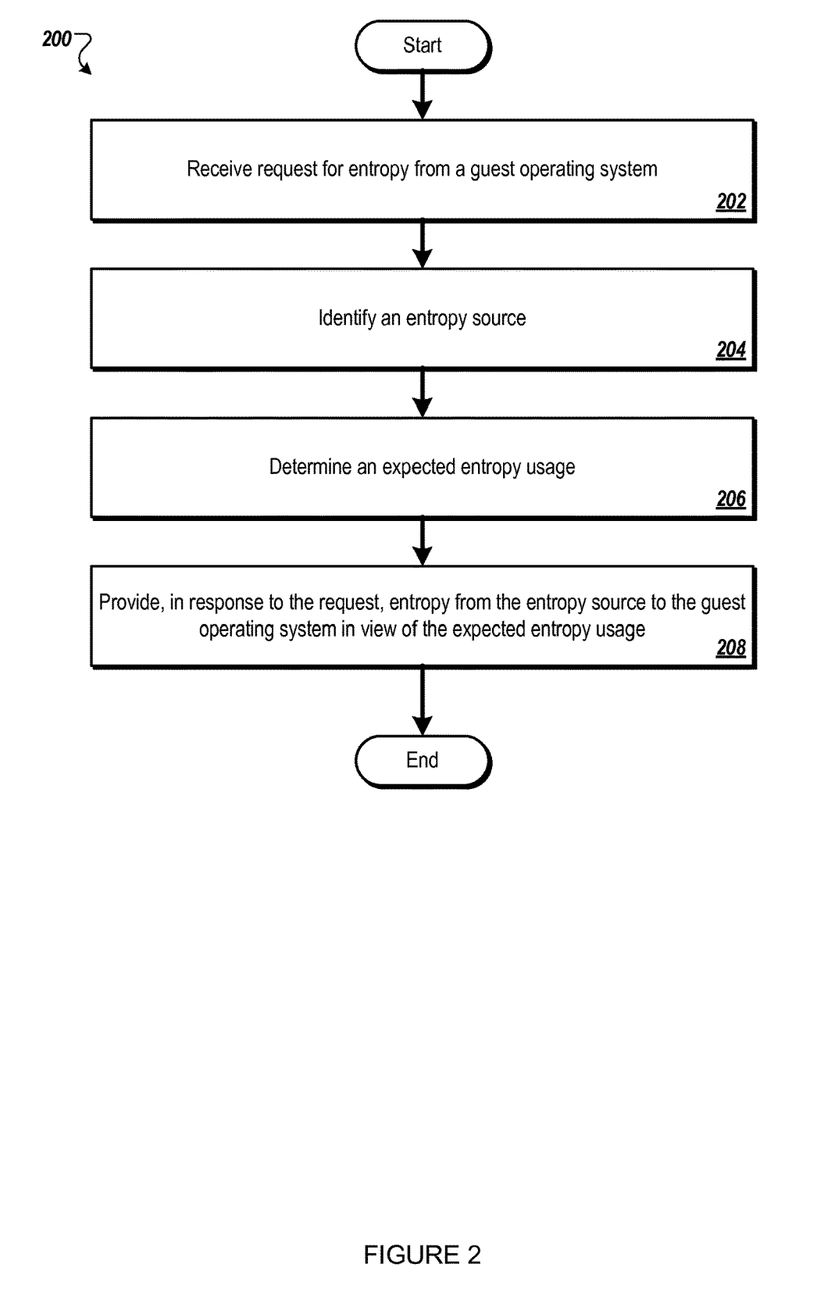
FIG. 2 is a flow diagram of a method for providing entropy to a guest operating system in accordance with some implementations.

FIG. 2 is a flow diagram of a method 200 for providing entropy to a guest operating system in accordance with some implementations. Method 200 can be performed by processing logic (e.g., in computing system 400 of FIG. 4) that may comprise hardware (e.g., circuitry, dedicated logic, programmable logic, microcode, etc.), software (such as instructions run on a processing device), firmware, or a combination thereof. In one implementation, method 200 is performed primarily by hypervisor 107 of FIG. 1. For clarity of presentation, the description that follows uses the host computing system 101 as examples for describing the method 200. However, another system, or combination of systems, may be used to perform the method 200.

Referring to FIG. 2, in one implementation, method 200 begins at block 202, with the hypervisor receiving a request for entropy from a guest operating system. The guest operating system can be running on the host computing system. The request for entropy can include a request for a set of one or more random numbers for a specific guest application. Alternatively, the guest operating system includes a guest entropy pool and the guest operating system requests entropy when the guest entropy pool is below a threshold level.

At block 204, the hypervisor identifies an entropy source. The entropy source can be at least one of an entropy pool, a random number generator of the host operating system, or a random number generator that is external to the host operating system.

At block 206, the hypervisor determines an expected entropy usage, which can include determining an expected entropy usage for multiple entropy consumers. The guest operating system can be one of the entropy consumers. Determining an expected entropy usage can also include determining an aggregate expected entropy usage among all of the entropy consumers. At block 208, the hypervisor provides, in response to the request, entropy from the entropy source to the guest operating system in view of the expected entropy usage.

Figure 3:
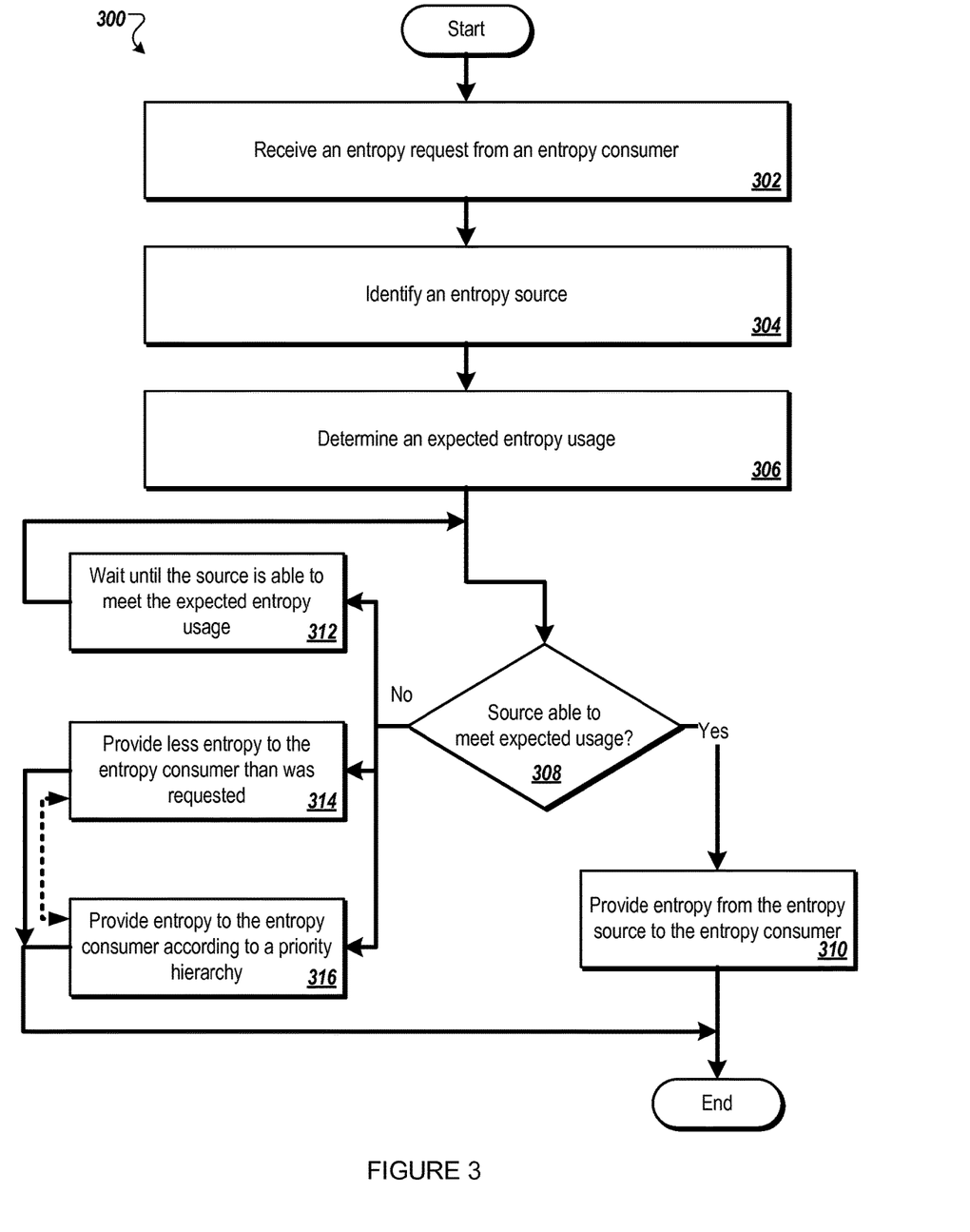
FIG. 3 is a flow diagram of a method for providing entropy to an entropy consumer in accordance with some implementations.

FIG. 3 is a flow diagram of a method 300 for providing entropy to an entropy consumer in accordance with some implementations. Method 300 can be performed by processing logic (e.g., in computing system 400 of FIG. 4) that may comprise hardware (e.g., circuitry, dedicated logic, programmable logic, microcode, etc.), software (such as instructions run on a processing device), firmware, or a combination thereof. In one implementation, method 300 is performed primarily by hypervisor 107 of FIG. 1. For clarity of presentation, the description that follows uses the host computing system 101 as examples for describing the method 300. However, another system, or combination of systems, may be used to perform the method 300.

Referring to FIG. 3, in one implementation, method 300 begins at block 302, with the hypervisor receiving a request for entropy from an entropy consumer. The entropy consumer can be a guest operating system or a host operating system. The request for entropy can include a request for a set of one or more random numbers.

At block 304, the hypervisor identifies an entropy source, as described herein.

At block 306, the hypervisor determines an expected entropy usage, as described herein. When the hypervisor determines that the entropy source is able to meet the expected entropy usage (block 308), then the hypervisor provides the requested entropy from the entropy source to the entropy consumer at block 310.

When the hypervisor determines that the entropy source is not able to meet the expected entropy usage (e.g., that the entropy request exceeds an ability of the entropy source to provide entropy) at block 308, then the hypervisor can proceed to different blocks. In one implementation, at block 312, the hypervisor can wait until the entropy source is able to meet the expected entropy usage before providing the entropy to the entropy consumer. For example, when the entropy source is able to meet the expected usage, it can notify the hypervisor about it. In another example, the hypervisor monitors the entropy source to determine when it is able to meet the expected usage. In a further implementation, when the hypervisor determines that the source is not able to meet the entropy request, the hypervisor can initiate a process to identify an additional entropy source to fulfill the request. Once the entropy source is able to meet the expected entropy usage, the hypervisor provides the entropy at block 310.

In another implementation, when the hypervisor determines that the source is not able to meet the expected entropy usage, the hypervisor can provide less entropy to the entropy consumer than was requested at block 314. The hypervisor can perform block 314 when the entropy source should supply entropy to one or multiple entropy consumers. The hypervisor can provide an amount of entropy that does not affect or substantially impair any other entropy consumer. Instead, the decreased amount of entropy can allow the entropy consumers to continue to execute, even at a reduced capacity. In one implementation (not shown in FIG. 3), the hypervisor receives an indication from an entropy source, which can be the same source or another source, that the entropy source is able to meet the expected usage. Once the entropy source is able to meet the expected entropy usage, the hypervisor provides the rest of the entropy to the entropy consumer that submitted the request.

In yet another implementation, when the hypervisor determines that the entropy source is not able to meet the expected entropy usage, the hypervisor can provide entropy the entropy consumer according to a priority hierarchy at block 316. The hypervisor can perform block 316 when the entropy source should supply entropy to one or multiple entropy consumers (e.g., host OSs, guest OSs, processes). The priority hierarchy can define which entropy consumers are to receive entropy before other entropy consumers. The priority hierarchy can also define threshold amounts, tiers, percentages, etc. of entropy that each entropy consumers is to receive. In some implementations, the hypervisor can provide less entropy to the entropy consumer than was requested according to the priority hierarchy, as shown by the dashed line that connects blocks 314 and 316.

Figure 4:
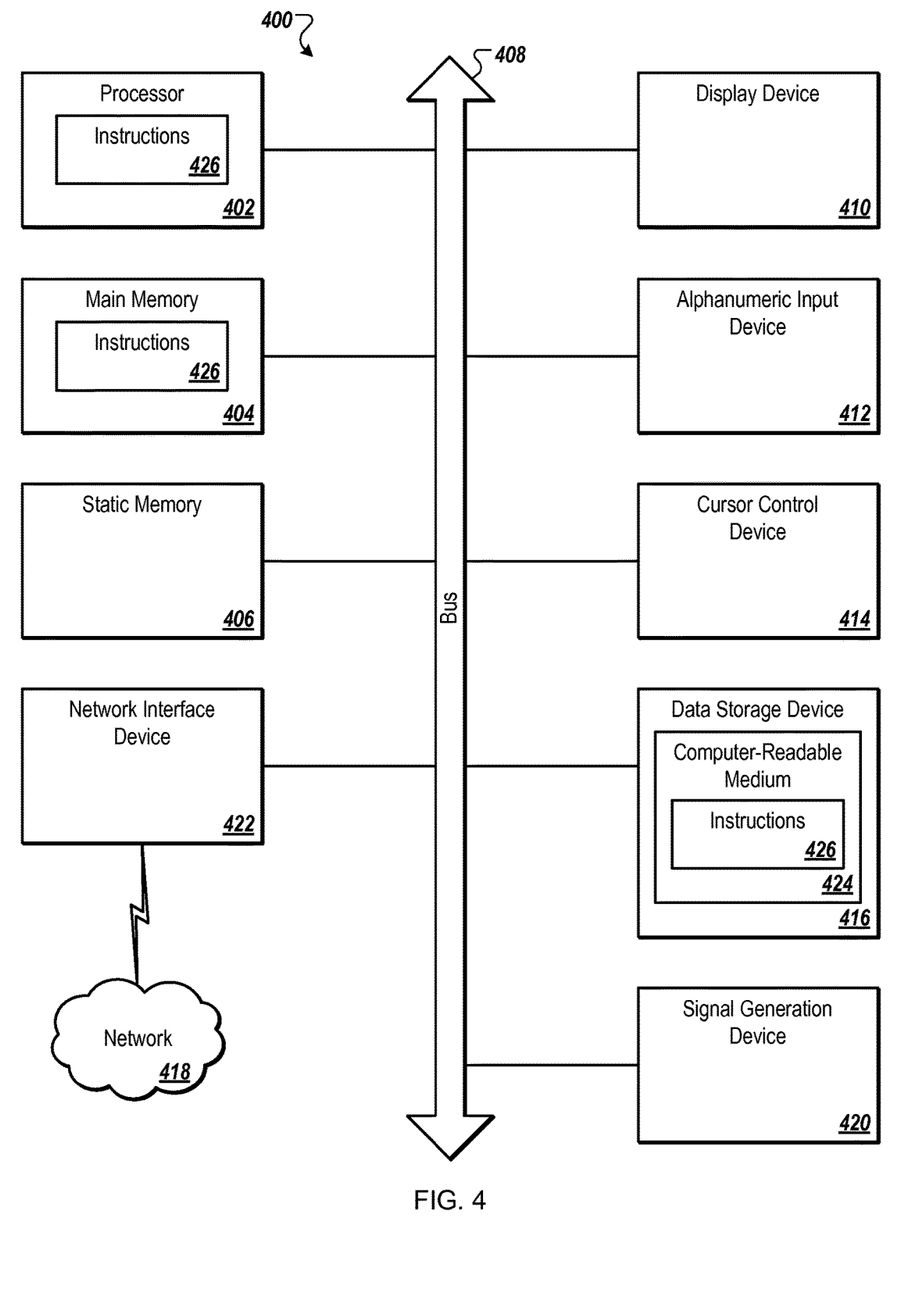
FIG. 4 is a schematic diagram that shows an example of a machine in the form of a computer system.

FIG. 4 is a schematic diagram that shows an example of a machine in the form of a computer system 400. The computer system 400 executes one or more sets of instructions 426 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 426 to perform any one or more of the methodologies discussed herein.

The computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions of the host computer system 101 for performing the operations and steps discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored the sets of instructions 426 of the host computer system 101 embodying any one or more of the methodologies or functions described herein. The sets of instructions 426 of the host computer system 101 may also reside, completely or at least partially, within the main memory 404 and/or within the processor 402 during execution thereof by the computer system 400, the main memory 404 and the processor 402 also constituting computer-readable storage media. The sets of instructions 426 may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions 426. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting", "transmitting", "receiving", "preventing", "associating", "determining," "creating", "permitting", "holding", "dissociating", "waiting," "exposing", "initiating", "identifying", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving, by a processing device executing a hypervisor of a host computer system, entropy requests from a plurality of guest operating systems running on the host computer system, wherein the entropy request comprises a request for a string of random computer data;
identifying, by the processing device executing the hypervisor, an entropy source;
determining, by the processing device executing the hypervisor, whether the entropy source can satisfy an expected aggregate entropy usage for multiple entropy consumers that consume entropy of the host computer system, wherein the multiple entropy consumers comprise at least the plurality of guest operating systems;
responsive to determining that the entropy source cannot satisfy the expected aggregate entropy usage, identifying a priority hierarchy for the multiple entropy consumers, wherein the priority hierarchy comprises an entropy distribution framework and the multiple entropy consumers are prioritized in the entropy distribution framework according to a set of criteria;
presenting, to each guest operating system of the plurality of guest operating systems, an entropy device corresponding to the entropy source as a paravirtualized device using paravirtualization techniques, wherein the entropy device is recognized by the plurality of guest operating systems via a corresponding driver installed in the plurality of guest operating systems; and
providing, using the entropy device in response to the request, entropy from the entropy source to each guest operating system of the plurality of guest operating systems in view of the expected aggregate entropy usage and in view of the priority hierarchy.

2. The method of claim 1, wherein the entropy comprises a set of random numbers.

3. The method of claim 1, wherein the entropy source is at least one of an entropy pool, a random number generator of a host operating system, or a random number generator that is external to the host operating system.

4. The method of claim 1, wherein the plurality of guest operating systems comprises a plurality of guest entropy pools, wherein the entropy requests are received from the plurality of guest operating systems when at least one of the plurality of guest entropy pools is below a threshold level.

5. The method of claim 1, further comprising determining the expected aggregate entropy usage by determining expected entropy usage for each of the multiple entropy consumers at the host computer system, wherein each guest operating system of the plurality of guest operating systems is one of the multiple entropy consumers.

6. The method of claim 1, wherein when the entropy requests exceed an ability of the entropy source to provide entropy in view of the expected aggregate entropy usage, the method further comprises waiting until the entropy source is able to meet the expected aggregate entropy usage before providing the entropy to each guest operating system of the plurality of guest operating systems.

7. The method of claim 1, wherein the entropy requests of the plurality of guest operating systems comprises requests for sets of random numbers, wherein providing the sets of random numbers to each guest operating system of the plurality of guest operating systems comprises providing fewer random numbers to each guest operating system than were requested when the entropy source is not able to fulfill the entropy request.

8. The method of claim 1, wherein the entropy source is used to fulfill the entropy requests, and wherein the method further comprising creating the priority hierarchy for the multiple entropy consumers, and wherein entropy is provided to the multiple entropy consumers according to the priority hierarchy.

9. A system comprising:
a memory; and
a processing device operatively coupled to the memory, the processing device to execute a hypervisor to:
receive entropy requests from a plurality of guest operating systems running on a host computer system, wherein the entropy request comprises a request for a string of random computer data;
identify an entropy source;
determine whether the entropy source can satisfy an expected aggregate entropy usage for multiple entropy consumers that consume entropy of the host computer system, wherein the multiple entropy consumers comprise at least the plurality of guest operating systems;
responsive to determining that the entropy source cannot satisfy the expected aggregate entropy usage, identify a priority hierarchy for the multiple entropy consumers, wherein the priority hierarchy comprises an entropy distribution framework and the multiple entropy consumers are prioritized in the entropy distribution framework according to a set of criteria;
present, to each guest operating system of the plurality of guest operating systems, an entropy device corresponding to the entropy source as a paravirtualized device using paravirtualization techniques, wherein the entropy device is recognized by the plurality of guest operating systems via a corresponding driver installed in the plurality of guest operating systems; and
provide, using the entropy device in response to the request, entropy from the entropy source to each guest operating system of the plurality of guest operating systems in view of the expected aggregate entropy usage and in view of the priority hierarchy.

10. The system of claim 9, wherein the entropy source is at least one of an entropy pool, a random number generator of a host operating system, or a random number generator that is external to the host operating system.

11. The system of claim 9, wherein the processing device further to determine the expected aggregate entropy usage by determining expected entropy usage for each of the multiple entropy consumers at the host computer system, wherein each guest operating system of the plurality of guest operating systems is one of the multiple entropy consumers.

12. The system of claim 9, wherein when the entropy requests exceed an ability of the entropy source to provide entropy in view of the expected aggregate entropy usage, the processing device further to wait until the entropy source is able to meet the expected aggregate entropy usage before providing the entropy to each guest operating system of the plurality of guest operating systems.

13. The system of claim 9, wherein the entropy of the plurality of guest operating systems comprises a request for sets of random numbers, wherein to provide the sets of random numbers to each guest operating system of the plurality of operating systems, the processing device further to provide fewer random numbers to each guest operating system than were requested when the entropy source is not able to fulfill the entropy request.

14. A non-transitory computer-readable storage medium having instructions that, when executed by a processing device via a hypervisor of a host computer system, cause the processing device to:
receive entropy requests from a plurality of guest operating systems running on a host computer system, wherein the entropy request comprises a request for a string of random computer data;
identify an entropy source;
determine whether the entropy source can satisfy an expected aggregate entropy usage for multiple entropy consumers that consume entropy of the host computer system, wherein the multiple entropy consumers comprise at least the plurality of guest operating systems;
responsive to determining that the entropy source cannot satisfy the expected aggregate entropy usage, identify a priority hierarchy for the multiple entropy consumers, wherein the priority hierarchy comprises an entropy distribution framework and the multiple entropy consumers are prioritized in the entropy distribution framework according to a set of criteria;
present, to each guest operating system of the plurality of guest operating systems, an entropy device corresponding to the entropy source as a paravirtualized device using paravirtualization techniques, wherein the entropy device is recognized by the plurality of guest operating systems via a corresponding driver installed in the plurality of guest operating systems; and
provide, using the entropy device in response to the request, entropy from the entropy source to each guest operating system of the plurality of guest operating systems in view of the expected aggregate entropy usage and in view of the priority hierarchy.

15. The non-transitory computer-readable storage medium of claim 14, wherein when the entropy requests exceed an ability of the entropy source to provide entropy in view of the expected aggregate entropy usage, the processing device to wait until the entropy source is able to meet the expected aggregate entropy usage before providing the entropy to each guest operating system of the plurality of guest operating systems.

16. The non-transitory computer-readable storage medium of claim 14, wherein the entropy requests of the plurality of guest operating systems comprises a request for sets of random numbers, wherein to provide the sets of random numbers to each guest operating system of the plurality of guest operating systems, the processing device to provide fewer random numbers to each guest operating system than were requested when the entropy source is not able to fulfill the entropy request.

17. The non-transitory computer-readable storage medium of claim 14, wherein the entropy source is used to fulfill the entropy requests, wherein the processing device to create the priority hierarchy for the multiple entropy consumers, and wherein entropy is provided to the multiple entropy consumers according to the priority hierarchy.

* * * * *